United States Patent [19]
Roeder

[11] 4,027,103
[45] May 31, 1977

[54] BURGLAR ALARM IMPROVEMENTS

[76] Inventor: George K. Roeder, Box 4335, Odessa, Tex. 79760

[22] Filed: Dec. 8, 1975

[21] Appl. No.: 638,834

Related U.S. Application Data

[63] Continuation-in-part of Ser. No. 506,439, Sept. 16, 1974, Pat. No. 3,937,891.

[52] U.S. Cl. .............................. 179/5 R; 179/1 HS
[51] Int. Cl.² ...................................... H04M 11/04
[58] Field of Search ......... 179/5 R, 5 P, 2 A, 90 B, 179/90 AD, 1 HS; 340/416, 274

[56] References Cited

UNITED STATES PATENTS

| | | | |
|---|---|---|---|
| 2,597,670 | 5/1952 | Pinto | 179/1 HS |
| 2,878,315 | 3/1959 | Agule | 179/5 P |
| 3,296,382 | 1/1967 | Klumb et al. | 179/1 HS |
| 3,384,720 | 5/1968 | Beatty | 179/1 HS |
| 3,510,593 | 5/1970 | Chappell | 179/5 R |
| 3,518,655 | 6/1970 | Saul | 340/274 |
| 3,546,382 | 12/1970 | Embury | 179/5 R |

*Primary Examiner*—Douglas W. Olms
*Attorney, Agent, or Firm*—Marcus L. Bates

[57] ABSTRACT

An alarm system having means by which unauthorized entrance into an enclosure activates electro-mechanical apparatus which dials a second telephone from a first telephone, thereby informing whomever might be present at the second telephone that a particular location is being burglarized.

8 Claims, 6 Drawing Figures

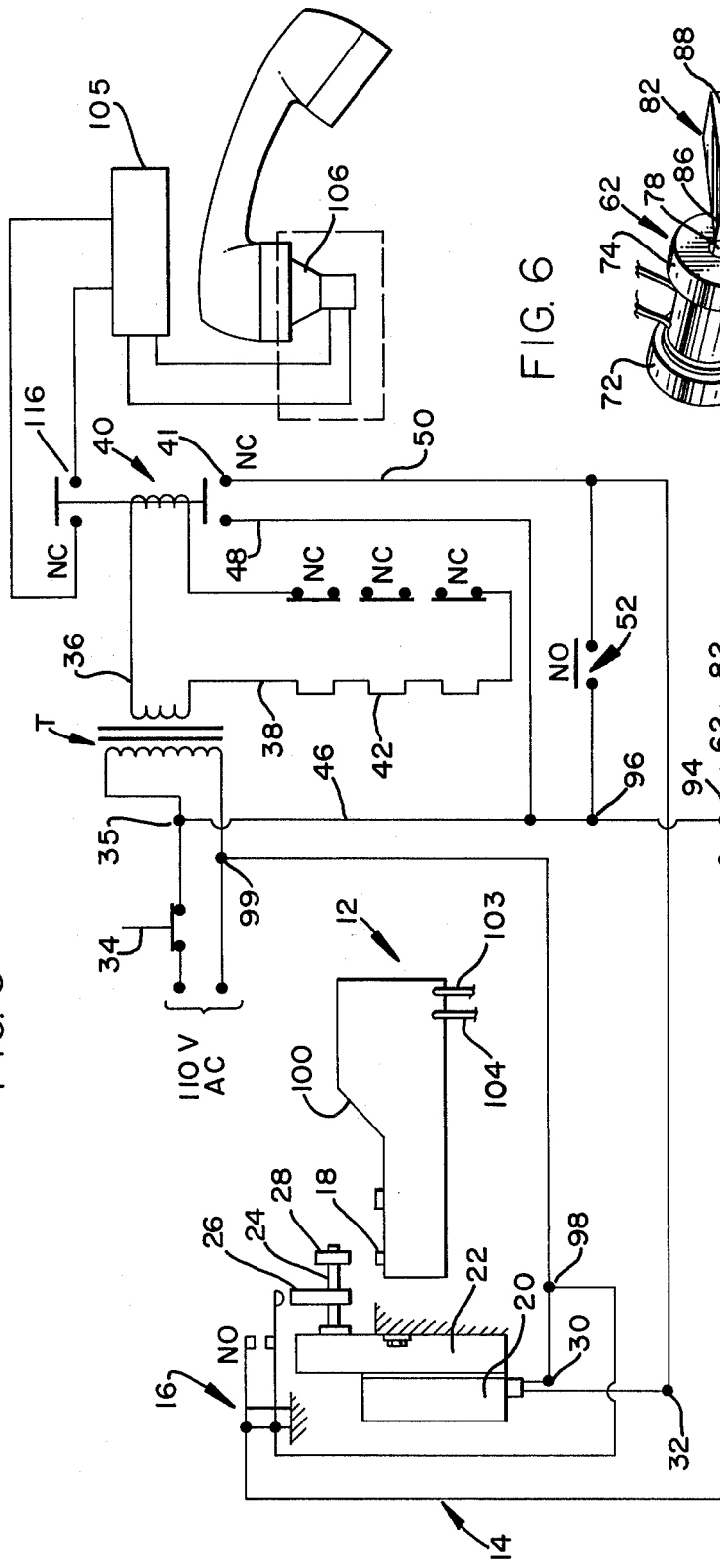
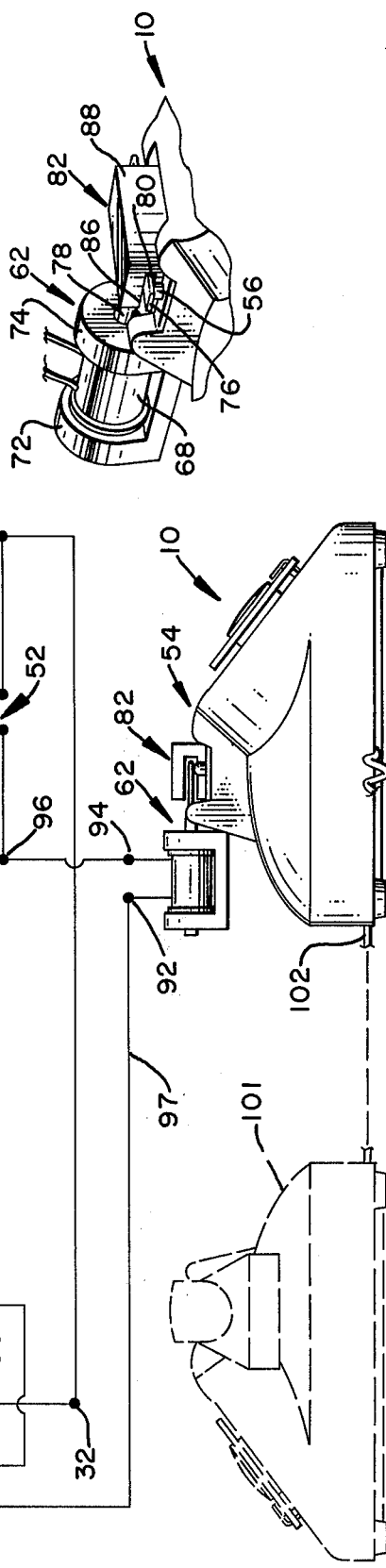
FIG. 5
FIG. 6

BURGLAR ALARM IMPROVEMENTS

RELATED PATENT APPLICATION

My copending U.S. patent application Ser. No. 506,439, filed Sept. 16, 1974, now U.S. Pat. No. 3,937,891 issued Feb. 10, 1976, of which the instant application is a continuation-in-part.

BACKGROUND OF THE INVENTION

The progressive breakdown of law and order in the United States has caused an alarming increase in the crime rate. Criminals and dangerous intruders continue to break and enter buildings and other enclosures, with the intent of unlawfully converting the owner's property into their own illegitimate and devious use. These robbers loot and plunder and maliciously destroy a substantial amount of the national wealth each year. Often these thieves are caught after they have left the robbed premises and following the act of converting stolen property into cash. Hence, it is difficult for the victim to provide law enforcement officers with the excessive high degree of proof required for the courts to punish and discourage the trespasser. Therefore, it is desirable that one be able to provide his premises with an inexpensive signal device by which anyone can be telephoned and advised that his premises are being burglarized. Moreover, it is desirable to be able to attain this attribute by using standard equipment available from most electrical hardware stores. Furthermore, it is desirable that such an expedient be simple to install in a small amount of time and be foolproof and reliable.

SUMMARY OF THE INVENTION

This invention relates to an alarm system having means by which unauthorized entrance into an enclosure activates electro-mechanical apparatus which dials a second telephone from a first telephone, thereby informing whomever might be present at the second telephone that a particular location is being burglarized. More specifically, the apparatus comprises circuitry having a plurality of switches which are actuated by movement of a closure member leading into the enclosure to be protected. One of the switches deactivates a relay, which actuates a motor-driven cam means. The cam means is arranged to sequentially rotate into contact with and move a pair of switches. One of the switches actuates a solenoid which releases the telephone switch button. This activates the telephone so that a dial tone is received. The cam means subsequently moves a switch button located on an automatic dialing apparatus. The dialing apparatus is arranged to connect the first telephone to any selected second telephone.

Accordingly, a primary object of the present invention is the provision of an electro-mechanical apparatus which dials a second telephone from a first telephone in response to unauthorized entrance into an enclosure.

Another object of the present invention is the provision of simple, inexpensive electrical and mechanical apparatus arranged into the form of a burglar alarm.

Still another object of the invention is to provide switch actuated apparatus connected to various closure means associated with an enclosure so that unauthorized entrance thereinto causes an automatic telephone dialing device connected to a first telephone to dial a second telephone.

The above objects are attained by the provision of a plurality of switches series connected to a solenoid actuated relay which energizes a motor-driven cam with the cam being arranged to actuate automatic dialing apparatus so that energization thereof causes a first telephone to dial a second telephone.

BRIEF DESCRIPTION OF THE DRAWINGS

FIG. 5 is a part diagrammatical, part schematical view of another arrangement of apparatus made in accordance with the present invention; and, FIG. 6 is a fragmentary perspective view of part of the present invention.

DETAILED DESCRIPTION OF THE PREFERRED EMBODIMENT

Figure 1:
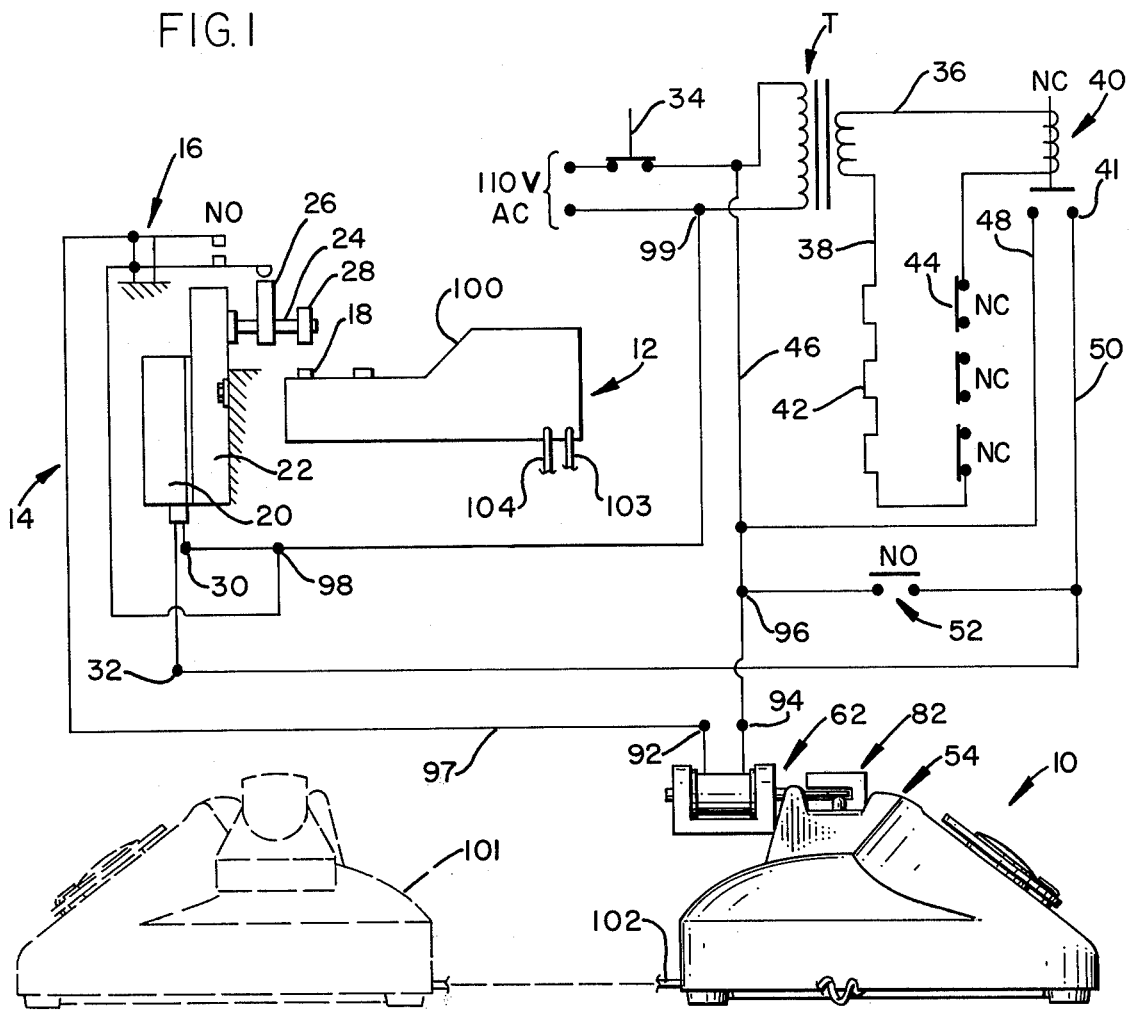
FIG. 1 is a part diagrammatical, part schematical view of one arrangement of apparatus made in accordance with the present invention.

In FIG. 1, the numeral 10 indicates an ordinary dial-type telephone having connected thereto means 12, representative of an automatic dialing apparatus, by which any predetermined telephone number can be called by merely energizing the apparatus in a well-known manner.

Numeral 14 indicates a motor-driven, cam-actuated assembly for engaging and depressing a plurality of switches, 16 and 18. Switch means 18 is associated with the automatic dialing apparatus.

The motor-driven cam device comprises an induction motor 20 having a reduction gear assembly 22 connected thereto for rotatably driving a shaft 24. The shaft has a cam means 26 and 28 affixed to the marginal free depending end thereof. Electrical conductors 30 and 32 provide a suitable source of current for the motor, as for example, 110 v. AC.

Figure 2:
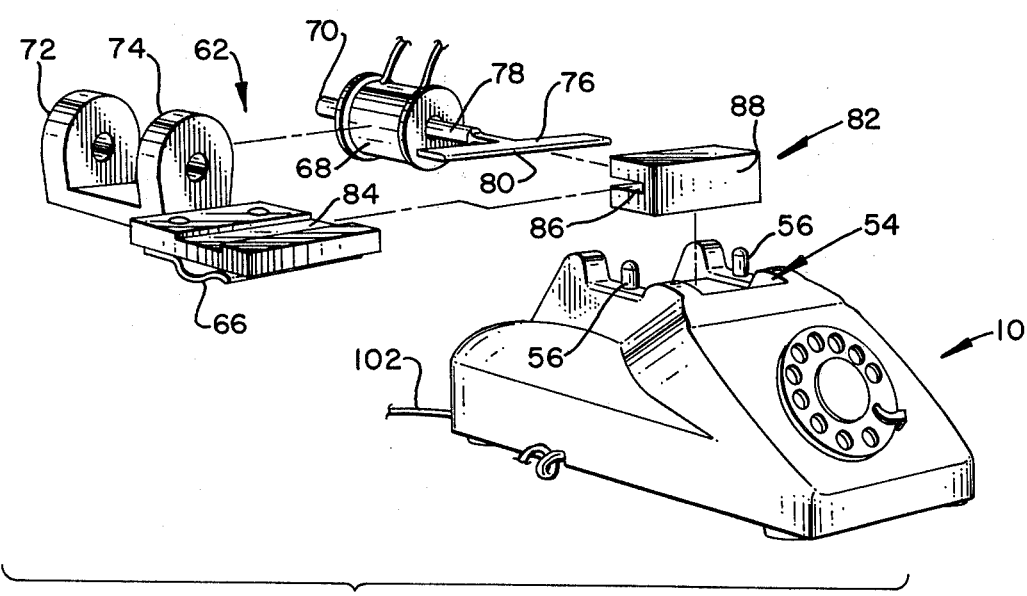
FIG. 2 is an enlarged, exploded view of part of the apparatus disclosed in FIG. 1.
Figure 3:
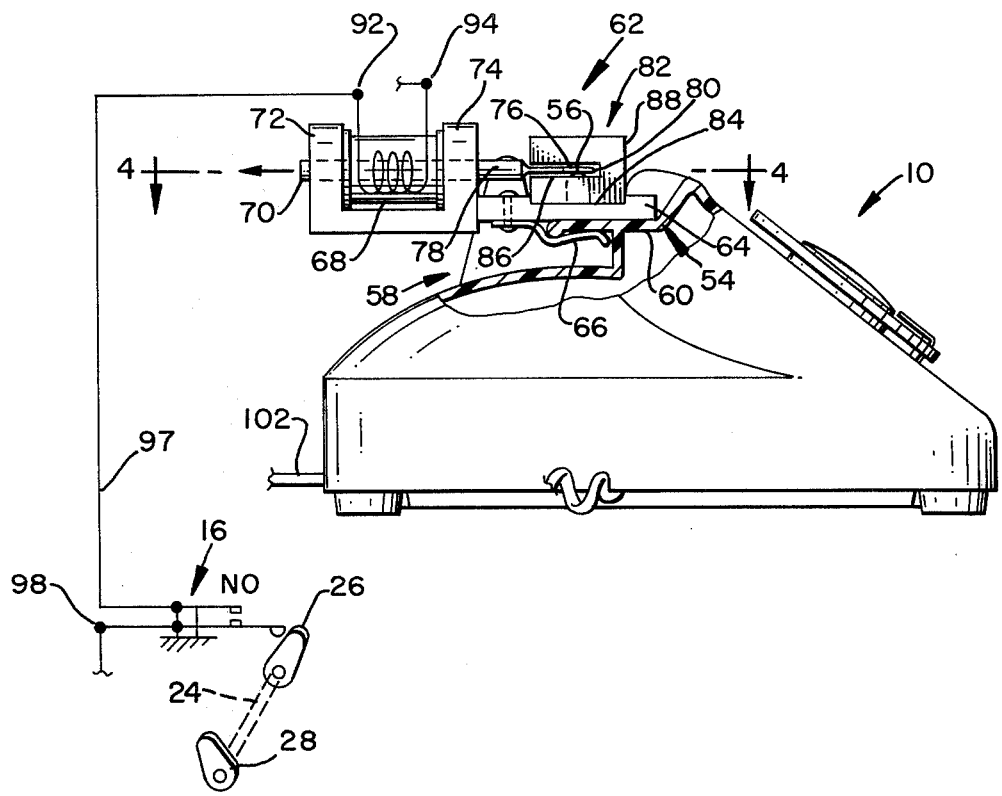
FIG. 3 is a part cross-sectional view taken along line 3—3 of FIG. 1.

As seen illustrated in FIGS. 1–3, the cam means is seen to be positioned in superimposed relationship respective to a solenoid switch 16 and a call switch 18 so that as the cam means is rotated by the shaft of the motor-driven gear reducer, it sequentially engages and depresses the two switches; thereby actuating the automatic dialing apparatus. The switch 16 is first moved to its alternate position, followed by actuation of switch 18.

In the illustration of FIG. 1, the primary winding of a transformer T is connected to the 110 volt line voltage with the illustrated switch 34 being interposed therebetween for disconnecting the entire circuitry therefrom. The secondary of the transformer is connected by lines 36 and 38 to the low voltage part of the circuitry, which includes the solenoid of a solenoid-actuated, normally closed switch assembly 40, a first switch means which includes a plurality of conducting elements 42, and a plurality of normally closed switches 44.

Solenoid-actuated switch 40 is series connected by electrical lines 46, 48, and 50 to the 110 volt or primary of the transformer to provide the motor 20 with a source of electricity. A normally opened switch 52 enables the motor to be actuated for the purposes of test at any time by short circuiting legs 46 and 50 of the circuitry.

Elements 42 preferably are small strips of foil attached to windows and the like in a serpentine manner, so that when the glass thereof is moved, as by breakage, the normally closed circuitry comprised of the series connected strips of foil will cease to conduct electricity.

The normally closed switches 44 are connected to be moved to the open position by a closure means associated with an enclosure means to be protected against unauthorized entry. For example, closed doors and the like. When one of the doors are opened, one of the series connected, normally closed switches associated therewith will be moved to the open position, thereby preventing current flow through the two current conducting legs 36 and 38. This action moves the N.C. switch of the solenoid actuated switch apparatus to the conducting configuration.

The motor preferably is a low torque, stallproof motor connected to a 450:1 gear reducer so that the cam means is rotated 4 rpm. This arrangement enables the cam to be set to cause the apparatus 12 to dial a second telephone about 15 seconds following energization of the switch contacts at 40.

One source of a motor such as described herein is Ingram Manufacturing Company, series 75, 3 watt, 115 volts, 60 cycle.

In the figures of the drawing, it will be noted that the telephone 10 is of convention construction and includes the usual cradle 54, which supports a handset in the usual manner. The handset conventionally holds the spaced receiver buttons 56 depressed by the weight thereof when the telephone is not in use. Outwardly opening cavity 58 is closed at the top by an upper wall surface 60. The cavity is provided by the telephone manufacturer so that the telephone can be easily held in a person's hand.

Solenoid actuated interrupter 62 is removably affixed to the receiver cradle by means of the platform 64, together with a spring clip 66 which is affixed to the lower side thereof so that wall 60 of the telephone can be received between the clip and the platform in the illustrated manner of FIGS. 1 and 3.

The interrupter includes a coil 68 having a metal core, or armature, 70 reciprocatingly received therein, so that when the coil is energized, the armature moves thereinto. The armature is slidably received within the axial bores formed within the spaced coil holders 72 and 74. Blade 76 has a longitudinally extending rear edge portion rigidly affixed to end 78 of the armature. The forward edge portion 80 of the blade is preferably curved so that it forms a nose which easily passes over and depresses the buttons of the telephone. Block 82 is seated within a groove 84 of the platform. The block includes a slot 86 within which there is reciprocatingly received the before-mentioned blade. Opposed ends 88 and 90 of the block are freely received between the two spaced telephone switch buttons.

Figure 4:
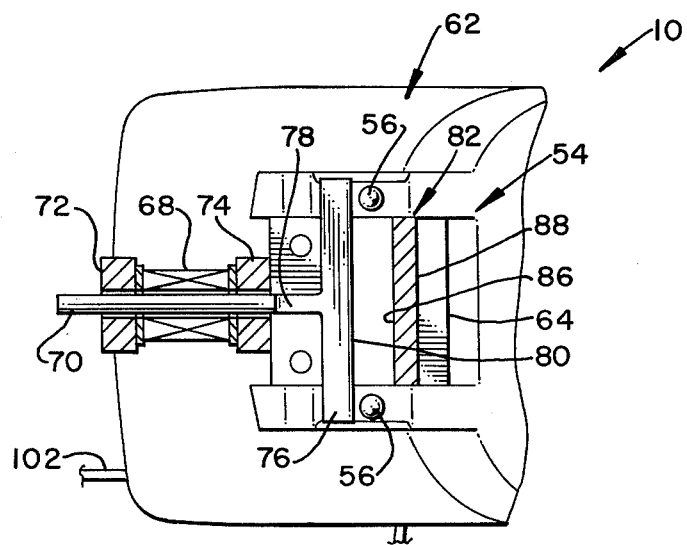
FIG. 4 is an enlarged, fragmentary, part cross-sectional top view taken along line 4—4 of FIG. 3 which discloses part of the apparatus seen in the foregoing figures.

As best seen in FIG. 4, the blade is of a length which enables it to simultaneously engage and hold depressed each of the telephone switch buttons. The slot 86 extends past the buttons in a direction away from the solenoid so that when the blade is extended, the buttons are held depressed at an elevation which renders the switch attached thereto inactive. Stated differently, when the blade is extended into the slot, the buttons are depressed into the "off" position.

Electrical wires 92 and 94 provide the solenoid with a source of current. Electrical wiring connects solenoid wire 94 to junction 96; while electrical wire 97 connects junction 92 to one of the terminals of the switch 16. The switch 16 is connected to the other leg of the 110 volt circuitry at junction 98 and 99.

The automatic dialing apparatus 12 is available from Bell Telephone Company, and is referred to as a "Magicall". The apparatus is programmed with a multiplicity of predetermined telephone numbers, each being indexed with indicia appearing in the illustrated viewing window 100. Any selected number displayed in the window is automatically dialed when the call button 18 is depressed.

The apparatus is placed into operation by programming the device so that a selected telephone number will alert a person at a second telephone 101. It is preferable that the party at the second telephone be knowledgeable of the burglar alarm system, or it will otherwise be necessary to send a transcribed message to the listener in order to appraise him of the unlawful act which is being carried out at that moment.

The cam means is superimposed above call switch in illustrated manner of FIGS. 1-5, with the cam normally being disengaged or spaced from the switches. The foil strips 42 are each series connected together, and to the series connected door switches, so that a current flow path is formed through the series connected foils, switches, transformer, and the solenoid. The switch 34 is closed to energize the transformer T with a suitable source of current, as for example, 110 volts AC. The apparatus is now in the standby configuration. Energization of the transformer moves switch 41 to the open position. Cams 26 and 28 are left clear of switches 16 and 18. The interrupter device is clipped onto the telephone cradle in a position whereby the receiver buttons each freely extend upward beside the block 82. Blade 76 is forwardly positioned against wall 87 of slot 86; and accordingly, the blade depresses the telephone switch buttons, since the shaft 70 is in the illustrated position of FIG. 4 when coil 68 is deenergized.

Prior to leaving the alarm device in the standby configuration, it is advantageous to close the N.O. switch 52 for a few seconds while observing the cam as it makes one revolution; thereby actuating each of the switches for test purposes. During this time, the telephone switch buttons may be held depressed with a finger, if desired.

When the operator must exit through one of the doors 42, it is advantageous that the switch 34 be actuated by a lock and switch device having a key therefore, so that the switch can be opened or closed from without the enclosure.

The present apparatus provides a foolproof burglar alarm system which is low in cost, easy to assembly, and foolproof in operation. For example, should one program the device 12 to telephone his home, and should a burglar intrude into his enclosure, one of the elements 42 or 44 would open, causing the solenoid 40 to become de-energized, thereby closing the switch 41, which in turn energizes motor 20, causing cam 26 to close switch 16, and thereafter causing cam 28 to actuate the call button. This action results in telephone 10 ringing the telephone 101.

Closure of switch 16 actuates solenoid 68, causing the armature thereof to retract blade 76 into the illustrated position of FIG. 4. Retraction of the blade releases the telephone switch buttons so that a "dial tone" is achieved. As shaft 24 continues to rotate, the cam 28 is brought into engagement with call button 18, causing the apparatus 12 to connect telephone 10 to telephone 101.

After the telephone 101 rings, the cam means continues to engage switches 16 and 18 each 15 seconds. This action continually dials the telephone 101 with the listener thereof hearing the "clicks" as the number is dialed over and over again. This action assures the listener that his alarm device has been actuated, and he should immediately telephone the proper authorities and appraise them of the situation.

In the embodiment of the invention disclosed in FIG. 5, wherein like or similar numerals refer to like or similar parts found in FIGS. 1–4, the circuitry is energized by closing contact 34 to energize the transformer and the solenoid coil of the solenoid actuated switch assembly 40. This action causes the N.O. switch contacts at 41 and 116 to assume an open position.

Test switch 52 can be closed to test the motor 20, as in the before-described manner.

Upon unauthorized entry into the enclosure means, one of the switch means, 42 or 44, will be moved to the open circuit position, thereby disrupting the current flow through the solenoid at 40, whereupon the two N.C. switch contacts at 41 and 116 close.

Current now can flow from junction 35, through conductor 48, contact 41, and along conductor 50 to the motor at junction 32, through the motor to the junction 30 which is connected to junction 99, to thereby complete the motor circuitry. Hence, the motor commences rotating the cam means into sequential engagement with the switch 16 and the call button.

Closure of switch 16 causes the blade to be retracted by the solenoid at 54, thereby releasing the telephone receiver switch buttons in ample time for a dial tone to be received prior to the automatic dialing apparatus being actuated.

A tape player 105, such as an ordinary tape recorder and player combination, is connected to be energized by closure of the electrical contacts at 116 so that a taped message commences to be audible over the speaker 106 concurrently with the energization of the motor 20. The speaker is positioned in close proximity of the ear piece of the telephone handset so that the taped message can relate the address of telephone 10 to the listener at telephone 101.

The Magicall is a Bell System Dialer Unit, manufactured by DASA Corporation, Andover, Mass., U.S.A., for Western Electric. The apparatus is described in Bulletin P/N 8021.

In each embodiment of the invention, the free marginal end 70 of the shaft 78 can be engaged and pushed with the finger to force the blade into engagement with the telephone receiver switch buttons, thereby reseting the apparatus into the standby configuration.

I claim:

1. An alarm system by which a first telephone set is connected to a second telephone set when the system is activated, comprising, in combination;
   a motor driven switch actuator, an automatic dialing apparatus by which said first telephone set is connected to said second telephone set when said appartus is energized; switch means including a call button by which said automatic dial apparatus is actuated;
   a telephone switch button interrupter by which the telephone switch button of said first telephone is depressed and released in response to said interrupter being de-energized and energized; circuit means including an interrupter switch for connecting said interrupter to a current source; a mount means by which said interrupter is mounted on said first telephone set; said interrupter includes a solenoid affixed to said mount means, an armature moved from a first to a second position when said solenoid is energized, a blade member affixed to said armature;
   said blade member being movable into superimposed relationship respective to the telephone switch buttons when said solenoid is de-energized such that the telephone switch buttons are depressed, said blade member being movable out of engagement with said telephone switch buttons when said solenoid is enegized such that the telephone switch buttons are released;
   said mount means includes a block having a slot formed therein, means by which said block is spaced respective to the telephone switch buttons such that said buttons freely reciprocate respective thereto, the slot of said block reciprocatingly receiving said blade therein, said slot being placed normal to the line of motion described when said buttons are reciprocated;
   circuit means including an alarm switch means for connecting the motor of said motor driven switch actuator to a source of current;
   means positoning said motor driven switch actuator to sequentially actuate said interrupter switch and said call button such that said telephone switch button interrupter releases said telephone switch button and thereafter actuates said call button;
   whereby, actuation of said alarm swtich means energizes said motor driven switch actuator, said motor driven switch actuator actuates said interrupter switch to cause the telephone switch button to be released so that a dial tone is received, and thereafter moves said call button whereupon the automatic dialing apparatus dials the second telephone thereby establishing communication between the first and second telephones.

2. The alarm system of claim 1 wherein said alarm switch is connected to be actuated upon unauthorized entry by mounting said alarm switch such that it is actuated in response to movement of a closure member associated with an enclosure or the like.

3. The alarm system of claim 1 wherein said motor driven switch actuator is provided with a rotatable cam means which rotates when said motor is energized;
   means mounting said cam means adjacent to said interrupter switch and said call button in such a manner that rotation of said cam means engages and first actuates said interrupter switch and thereafter engages and actuates said call button.

4. The alarm system of claim 1 wherein said alarm switch is a normally closed solenoid actuated switch; the solenoid of said solenoid actuated switch being series connected to a plurality of series connected switches and to a power source, means by which said series connected switches are positioned to be moved to the non-conducting configuration upon movement of a closure means associated with an enclosure.

5. The alarm system of claim 1 wherein said motor driven switch actuator is provided with a rotatable cam means which rotates when said motor is energized;

said cam means being arranged adjacent to said interrupter switch and said call button such that rotation of said cam means actuates said interrupter switch and said call button;

said alarm switch is a normally closed solenoid actuated switch; the solenoid of said solenoid actuated switch being series connected to a plurality of series connected switches and to a power source, means by which said series connected switches are positioned to be moved to the non-conducting configuration upon movement of a closure means associated with an enclosure.

6. An alarm system by which unauthorized entrance through a closure means into an enclosure causes a first telephone system to establish communication with a second telephone system comprising:

a first switch means for connection to a closure means so that movement of the closure means activates said first switch means;

a motor-driven switch actuator, means forming an automatic dialing apparatus by which a first telephone can be connected to a second telephone;

circuit means by which said automatic dialing apparatus can be connected to a first telephone; means, including a call switch on said automatic dialing apparatus, by which the first telephone will dial the second telephone when said call switch is activated;

circuit means connected to said first switch means for causing the motor of said motor-driven switch actuator to be energized upon movement of the closure means to which said first switch is connected;

means forming a telephone switch button interrupter by which the telephone switch button on a first telephone can be held depressed until said telephone switch button interrupter is energized; means including an interrupter switch for energizing said telephone switch button interrupter;

said telephone switch button interrupter includes a mount means, a solenoid affixed to said mount means, an armature moved from a first to a second position when said solenoid is energized, a blade member affixed to said armature;

said blade member being movable into superimposed relationship respective to the telephone switch button when said solenoid is de-energized such that the telephone switch buttons are depressed, said blade member being movable out of engagement with said telephone switch buttons when said solenoid is energized such that the telephone switch buttons are released;

said mount means includes a block having a slot formed therein, said block having edge portions spaced from the telephone switch buttons, said slot of said block reciporcatingly receiving said blade therein, said slot being placed normal to said buttons; and means by which said motor-driven switch acutator is positioned respective to said automatic dialing apparatus and said interrupter switch such that said interrupter switch and said call switch are sequentially actuated when said motor-driven switch actuator is energized.

7. The alarm system of claim 6 wherein said motor-driven switch actuator is a motor-driven reduction gear assembly having an output shaft, a cam affixed to said shaft, said cam being arranged respective to said motor-driven reduction gear assembly, said shaft, said interrupter switch, and said call switch, so that rotation of said shaft causes said cam to engage and activate said call switch after said interrupter switch has been energized.

8. The alarm system of claim 6 wherein said alarm switch is normally closed solenoid actuated switch; the solenoid of said solenoid actuated switch being series connected to a plurality of series connected switches and to a power source, means by which said series connected switches are positioned to be moved to the non-conducting configuration upon movement of a closure means associated with an enclosure.

* * * * *